United States Patent [19]

Yoshihara et al.

[11] Patent Number: 5,172,233
[45] Date of Patent: Dec. 15, 1992

[54] STILL CAMERA APPARATUS

[75] Inventors: Takafumi Yoshihara; Yasuhiro Komiya, both of Hachioji, Japan

[73] Assignee: Olympus Optical Co., Ltd., Tokyo, Japan

[21] Appl. No.: 667,960

[22] Filed: Mar. 12, 1991

[30] Foreign Application Priority Data

Mar. 20, 1990 [JP] Japan .................................. 2-68075

[51] Int. Cl.⁵ .......................................... H04N 5/228
[52] U.S. Cl. .................................... 358/222; 354/65; 359/554; 359/555; 359/556; 359/557
[58] Field of Search ........... 358/222, 227, 212, 213.17; 359/554, 555, 556, 557; 354/65, 70, 202

[56] References Cited

U.S. PATENT DOCUMENTS

| | | | |
|---|---|---|---|
| 4,264,161 | 4/1981 | Hosoe et al. | 354/31 |
| 4,320,948 | 3/1982 | Hosoe et al. | 354/31 |
| 4,780,739 | 10/1988 | Kawakami et al. | 354/65 |

Primary Examiner—Michael J. Tokar
Assistant Examiner—Joseph Colaianni
Attorney, Agent, or Firm—Frishauf, Holtz, Goodman & Woodward

[57] ABSTRACT

In an electronic still camera apparatus wherein an image of an object is incident on an image pickup surface of a CCD through an optical lens, the object image passed the optical lens is divided into a portion entering the CCD and a portion entering a two-dimensional PSD. The two-dimensional PSD detects a center of gravity of a light distribution of the object image, and a detection signal is supplied to a deviation detector comprising a sample-hold circuit and a differential amplifier. The deviation detector stores the detection signal at the time of start of image pickup, and the differential amplifier compares the stored signal and a detection signal output from the PSD during image pickup. A deviation detection signal corresponding to the comparison result is output. On the basis of the deviation detection signal, at least one of the optical lens and the CCD is moved in a direction perpendicular to the optical axis of the optical lens so as to reduce the deviation of the center of gravity of the light distribution to zero.

14 Claims, 7 Drawing Sheets

STILL CAMERA APPARATUS

BACKGROUND OF THE INVENTION

1. Field of the Invention

The present invention relates to a still camera apparatus, such as a still camera or an electronic still camera, for photographing or picking up a still image of an object, which apparatus has a so-called a blurring-prevention function for effectively preventing blurring of an object image due to camera shaking at the time of exposure.

2. Description of the Related Art

When an object is photographed by a conventional still camera using a silver salt film, if the camera is shaken by the hand at the time of exposure, the position of an object on a film is displaced and therefore the obtained photograph of the object is blurred. In particular, this undesirable phenomenon occurs frequently in the case of long-time exposure or a photograph using a telephotographic or macro lens.

In the prior art, in order to prevent blurring of photograph due to camera shaking and obtain a clear photograph with high resolution, a camera is fixed to a tripod, or an auxiliary light source such as a strobe is used to shorten the exposure time to such a degree that camera shaking is regarded as negligible. However, the use of an auxiliary means such as tripod and strobe is bothersome, and the ease of handling of the camera is lost. Further, the shatter chance may be lost due to the usage of the auxiliary means.

The same drawback is found in an electronic still camera using image pickup means such as a charge-coupled device (CCD) in lieu of the silver salt film.

As has been stated above, in the conventional still camera and electronic still camera, the auxiliary means such as a tripod and a strobe must be used in order to cancel the influence of camera shaking at the time of exposure, and therefore the handling of the camera is bothersome.

SUMMARY OF THE INVENTION

An object of the present invention is to provide a still camera apparatus capable of preventing blurring of a photograph due to a positional deviation of an image of an object in relation to a screen, in the case where the camera is shaken at the time of exposure.

Another object of the invention is to provide an apparatus capable of detecting camera shaking on the basis of the center of gravity of a light distribution of an image of an object, wherein erroneous detection of camera shaking due to a variation of the light distribution of only a part of the object image can be prevented.

According to an aspect of the present invention, there is provided a still camera apparatus wherein an image of an object is incident on an image pickup surface of image pickup means through an optical lens, the apparatus comprising:

first detection means having a two-dimensional photoelectric converter for receiving the object image incident on the image pickup surface of the image pickup means, the first detection means outputting a detection signal representing a center of gravity of a light distribution of the object image;

second detection means for detecting a variation of the center of gravity, on the basis of the detection signal output from the first detection means during exposure; and deviation correction means for moving at least one of the optical lens and the image pickup means in a direction perpendicular to the optical axis of the optical lens, so as to reduce the variation of the center of gravity to zero on the basis of the detection result of the second detection means.

According to another aspect of the invention, there is provided a camera shaking detection apparatus comprising:

first detection means having a plurality of two-dimensional photoelectric converters for receiving respective areas of an object image into which are obtained by dividing a whole object image, the first detection means outputting detection signals representing the centers of gravity of light distributions of the respective areas of the object image; and second detection means for detecting variations of the centers of gravity of the light distributions of the respective areas of the image, on the basis of the variations of the detection signals output from the first detection means, and detecting camera shaking on the basis of an averaged value of effective ones of the detection results.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Embodiments of a still camera apparatus according to the present invention will now be described with reference to the accompanying drawings. Although the present invention is applicable to a conventional still camera using a silver salt film, the embodiments of the invention are described with reference to an electronic camera, especially an electronic still camera.

Figure 1:
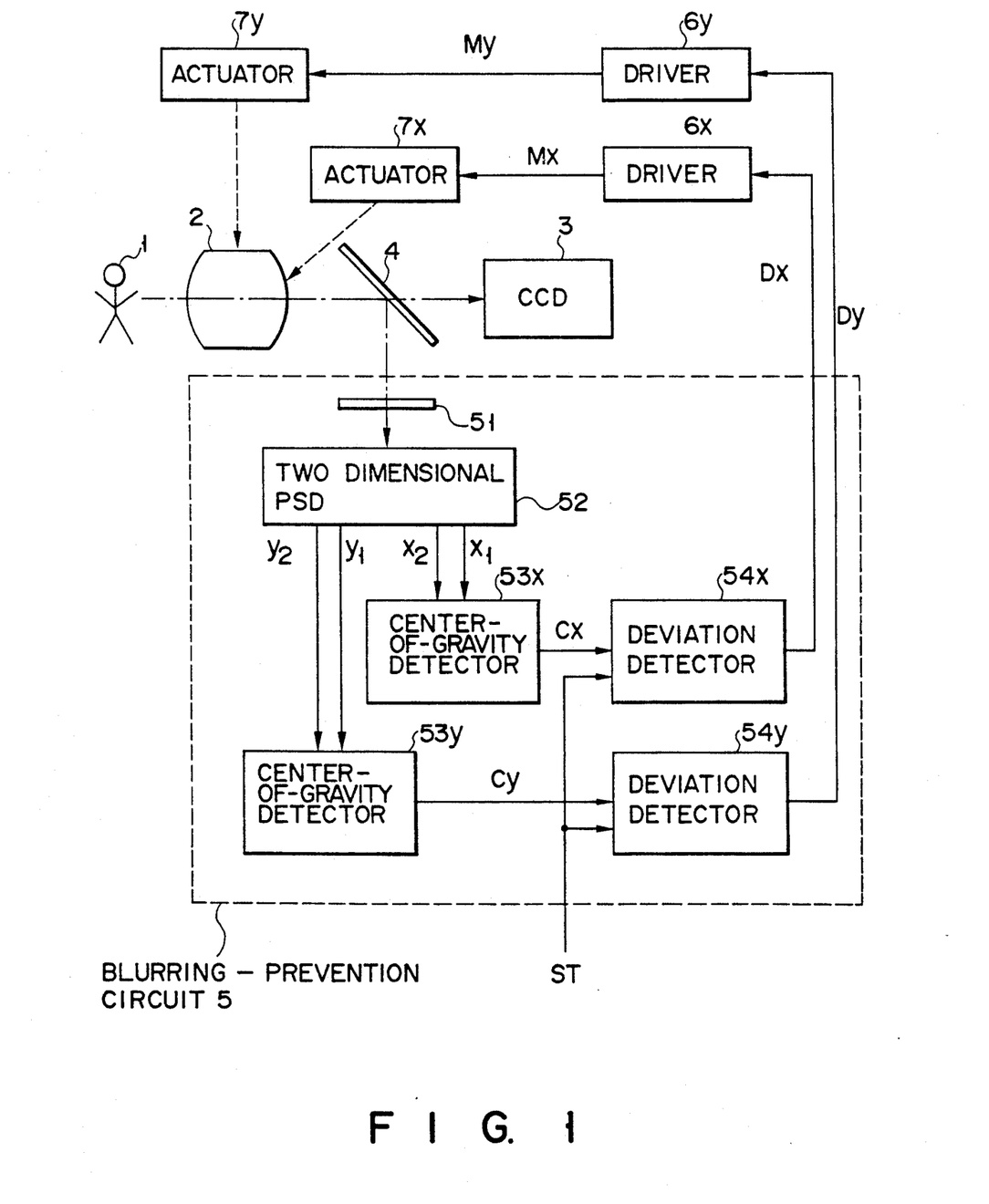
FIG. 1 shows the structure of a main part of an electronic still camera according to a first embodiment of the still camera apparatus of the present invention.

FIG. 1 shows the structure of a main part of an electronic still camera according to a first embodiment of the present invention. An optical image of an object 1 is made incident on the image pickup surface of a solid-state image pickup device such as a CCD (charge-coupled device) 3, serving as image pickup means, through an optical lens 2. The image pickup means is not limited to the solid-state image pickup means; an image pickup tube or the like may also be used. In the case of the solid-state image pickup device, it is not limited to the CCD, but a metal-oxide semiconductor (MOS) device or the like may be used. The CCD 3 electronically picks up the image of the object 1, and the image signal from the CCD 3 is recorded on a recording medium (not shown) through a processing circuit (not shown). The recording processing of the image signal, which is not directly related to the subject matter of the present invention, is not described here. Various types of conventional signal processing methods for electronic still cameras may be employed.

A half mirror 4 is disposed on an optical axis connecting the optical lens 2 and the CCD 3. An optical image, which has passed through the half mirror 4, is made incident on the CCD 3. The optical image, which is reflected by the half mirror 4, is input to a blurring-prevention circuit 5. The circuit 5 includes a two-dimensional PSD (Position Sensitive Detector) 52 as a photoelectric converter. The image reflected by the half mirror 4 passes through an optical filter 51 and enters the two-dimensional PSD 52.

Figure 2:
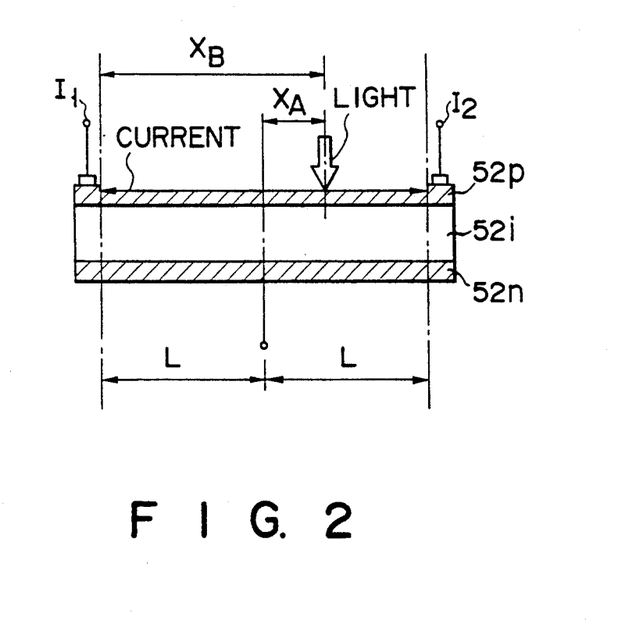
FIG. 2 shows a cross-sectional structure of a two-dimensional PSD used in the first embodiment.

The two-dimensional PSD 52 detects the center of gravity of a light distribution of the input object image. For example, as is shown in FIG. 2, the PSD 52 has a three-layer structure of a silicon wherein a p-type semiconductor layer 52p is disposed on the upper surface of an intermediate layer 52i, and an n-type semiconductor layer 52n is disposed on the lower surface of the intermediate layer 52i. When light enters the surface of p-type semiconductor layer 52p, a charge proportional to the light energy is generated at the position of incidence. The charge flows, as light current, through the p-type semiconductor layer 52p serving as a resistor layer. Then, the charge is output from electrodes $I_1$ and $I_2$ provided at both ends of the PSD 52 in the directions of x and y. The resistor layer 52p has uniform resistance over the entire area; thus, the light current is divided and output in inverse proportion to the distance between the incidence position to the electrode. In FIG. 2, the light is shown as beam; however, in fact, the object image is made incident on the entire surface of the PSD 52 with a predetermined light distribution. Thus, the electrodes $I_1$ and $I_2$ output light currents corresponding to the center of gravity of the light distribution of the object image.

Figure 3:
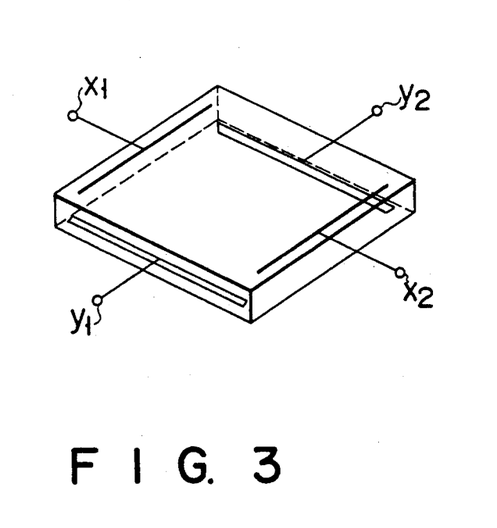
FIG. 3 shows the arrangement of electrodes in the two-dimensional PSD.
Figure 4:
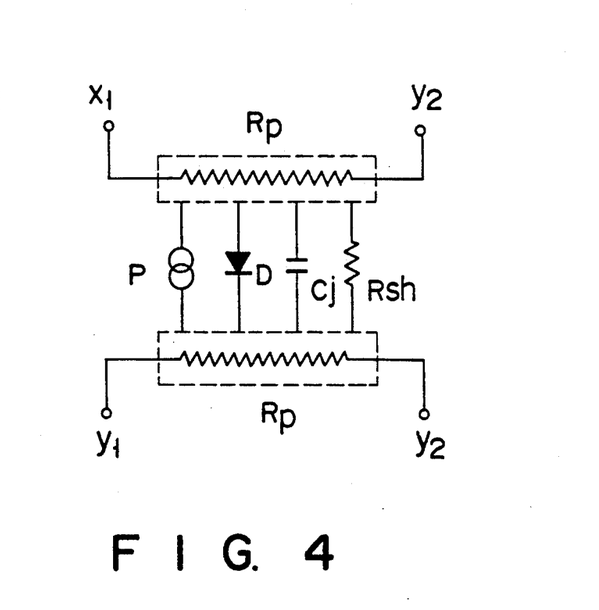
FIG. 4 shows an equivalent circuit of the two-dimensional PSD.

There are two types of two-dimensional PSDs; a double-side division type and a surface-side division type, depending on the arrangement of x- and y-electrodes. FIG. 3 shows the double-side division type wherein a x-directional light current component is taken out from the surface-side p-layer 52p and a y-directional light current component is taken out from the reverse-side n-layer 52n. In the surface-side division type, x- and y-components are taken out only from the surface-side layer. In the present embodiment, the double-side division type PSD is employed. FIG. 4 shows an equivalent circuit of the double-side division type two-dimensional PSD. Symbol P denotes a current source, D an ideal diode, Cj a junction capacitance, Rsh a parallel resistor, and Rp a positioning resistor for detecting the incident position of the light.

Figure 5A:
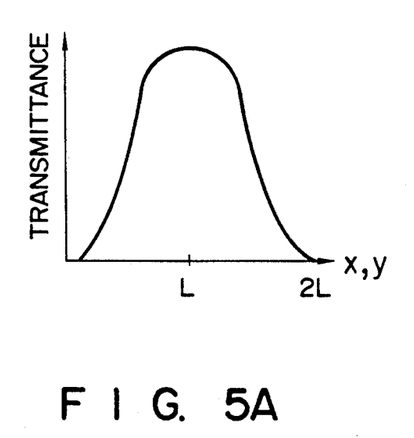
FIGS. 5A and 5B show examples of transmittance characteristics of an optical filter used in the first embodiment.
Figure 5B:
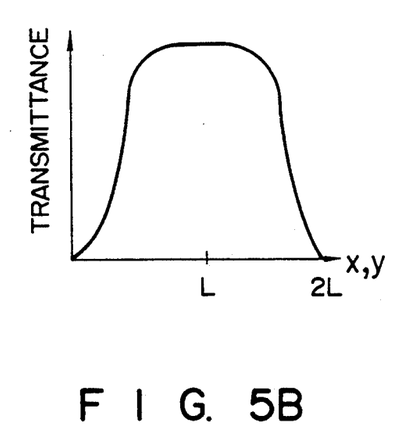

The transmittance characteristic of the optical filter 51 has a maximum value at the center portion thereof, and decreases towards the peripheral portions. Thus, the influence of entrance/exit of object image into/from the peripheral portions of the light receiving frame of the two-dimensional PSD 52 is reduced. FIGS. 5A and 5B show examples of light transmittance characteristics of the optical filter 51.

The x-directional components $x_1$ and $x_2$ and the y-directional components $y_1$ and $y_2$ of the light current output from the two-dimensional PSD 52 are input, respectively, to center-of-gravity detectors 53x and 53y. The center-of-gravity detectors detect, from the x-directional components $x_1$ and $x_2$ and the y-directional components $y_1$ and $y_2$ of the light signal, x-directional and y-directional centers of gravity of the light distribution of the object image incident on the light receiving surface of the two-dimensional PSD 52, that is, the positions on both sides of which the light amounts are equal.

If the center of the light receiving surface of the PSD 52 is taken as an origin of the X-Y coordinates, $X_A$ and $X_B$ of FIG. 2 are expressed as follows:

$$(I_2 - I_1)/(I_1 + I_2) = X_A/L$$

$$(I_2 - I_1)/(I_1 + I_2) = (X_B - L)/L$$

Therefore, detection signal values Cx and Cy output from the detectors 53x and 53y representing the center of gravity of the light distribution are expressed by the following equations, when the length of one side of PSD 52 is 2L:

$$Cx = L \cdot (x_2 - x_1)/(x_1 + x_2) \tag{1}$$

$$Cy = L \cdot (y_2 - y_1)/(y_1 + y_2) \tag{2}$$

The center-of-gravity detection signals Cx and Cy thus obtained are input to center deviation detectors 54x and 54y.

Figure 6:
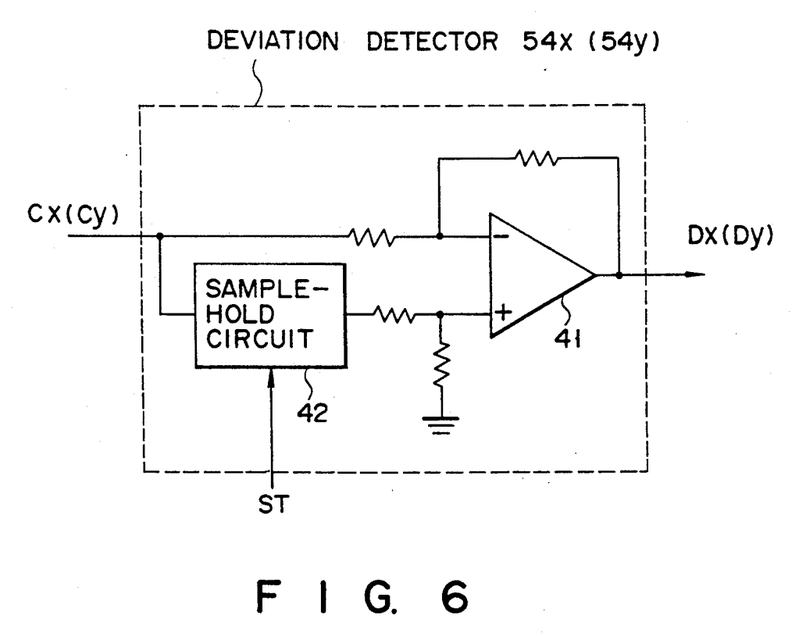
FIG. 6 shows an example of the structure of a deviation detector.

For example, as is shown in FIG. 6, each of the center deviation detectors 54x and 54y comprises a differential amplifier 41 and a sample-hold circuit 42. The sample-hold circuit 42 holds the center-of-gravity detection signal Cx and Cy at the time of exposure start, in synchronism with an exposure start signal ST for the CCD 3. The exposure start signal ST is generated from a timing generator (not shown) in interlock with a shutter release operation. The differential amplifier 41 performs a subtraction operation with respect to the value of the center-of-gravity detection signal held by the sample-hold circuit 42 at the time of exposure start, and the current value of the center-of-gravity detection signal Cx and Cy output from the center-of-gravity detectors 53x and 53y at any time during the subsequent exposure time. The differential amplifier 41 outputs a signal corresponding to the subtraction result. Specifically, the differential amplifier 41 outputs a center-of-gravity deviation detection signal Dx and Dy corresponding to the variation of the center-of-gravity detection signal Cx and Cy of the light distribution of the object image during the exposure time, that is, corresponding to the degree of camera shaking. Thus, the degree and direction of camera shaking are detected.

The deviation detection signals Dx and Dy are supplied to actuator drivers 6x and 6y. In accordance with the deviation detection signals Dx and Dy, the actuator drivers 6x and 6y generate drive signals Mx and My for approaching the center-of-gravity deviation to zero. Actuators 7x and 7y are driven by the drive signals Mx and My. The actuators 7x and 7y are disposed on a support table (not shown) which supports the image pickup optical lens 2. The actuators 7x and 7y move the optical lens 2 in x- and y-directions, which are perpendicular to the optical axis thereof.

The operation of the first embodiment having the above structure will now be described. When a shutter button (not shown) is depressed, an optical image of the object 1 is formed on the CCD 3 through the optical lens 2. Specifically, the exposure to the object image is started. Part of the object image is reflected by the half mirror 4 and received by the two-dimensional PSD 52. The PSD 52 outputs the light signals $x_1$, $x_2$ and $y_1$, $y_2$ corresponding to the light distribution of the object image. On the basis of the signals $x_1$, $x_2$ and $y_1$, $y_2$, the center-of-gravity detectors 53x and 53y detect the centers of gravity Cx and Cy of the light distribution of the object image on the light-receiving surface of the two-dimensional PSD 52, according to the equations (1) and (2). The center-of-gravity detection values Cx and Cy, which are obtained at the time of exposure start, are held as, initial detection values, in the sample-hold circuits 42 of the center-of-gravity deviation detectors 54x and 54y in synchronism with the exposure start signal ST.

If the camera is shaken due to a shaking of the operator's hand during exposure, the center-of-gravity detectors 53x and 53y output detection signals Cx and Cy corresponding to the degree of camera shaking. Thus, the center-of-gravity deviation detectors 54x and 54y output signals Dx and Dy corresponding to the difference between the initial detection values and the current detection values. The signals Dx and Dy are supplied to the actuator drivers 6x and 6y. The actuators 7x and 7y are driven by the actuator drivers 6x and 6y so as to reduce the signals Dx and Dy to zero. As a result, the image pickup optical lens 2 is moved in a direction perpendicular to the optical axis thereof to cancel the deviation of the center position. The above feedback control is repeated during exposure.

Even if the camera is shaken during exposure and the position of the object image is displaced owing to the shaking of the camera, the displacement is canceled and reduced to zero by the feedback control of the blurring-prevention circuit 5. For example, in a dark place or at night, an object image free from the influence of camera shaking can be obtained, even without the use of a tripod or a strobe. Therefore, a high-quality image free from the influence of camera shaking can easily be obtained without degrading the ease of handling of the camera.

Other embodiments of the present invention will now be described. In the description of the other embodiments, the structural parts similar to those of the first embodiment are denoted by the same reference numerals, and detailed descriptions thereof are omitted. In the first embodiment, the camera shaking is canceled by controlling the position of the optical axis of image pickup optical lens 2; by contrast, in a second embodiment, the camera shaking is canceled by controlling the position of the CCD 3. The first and second embodiments are similar in the other respects.

Figure 7:
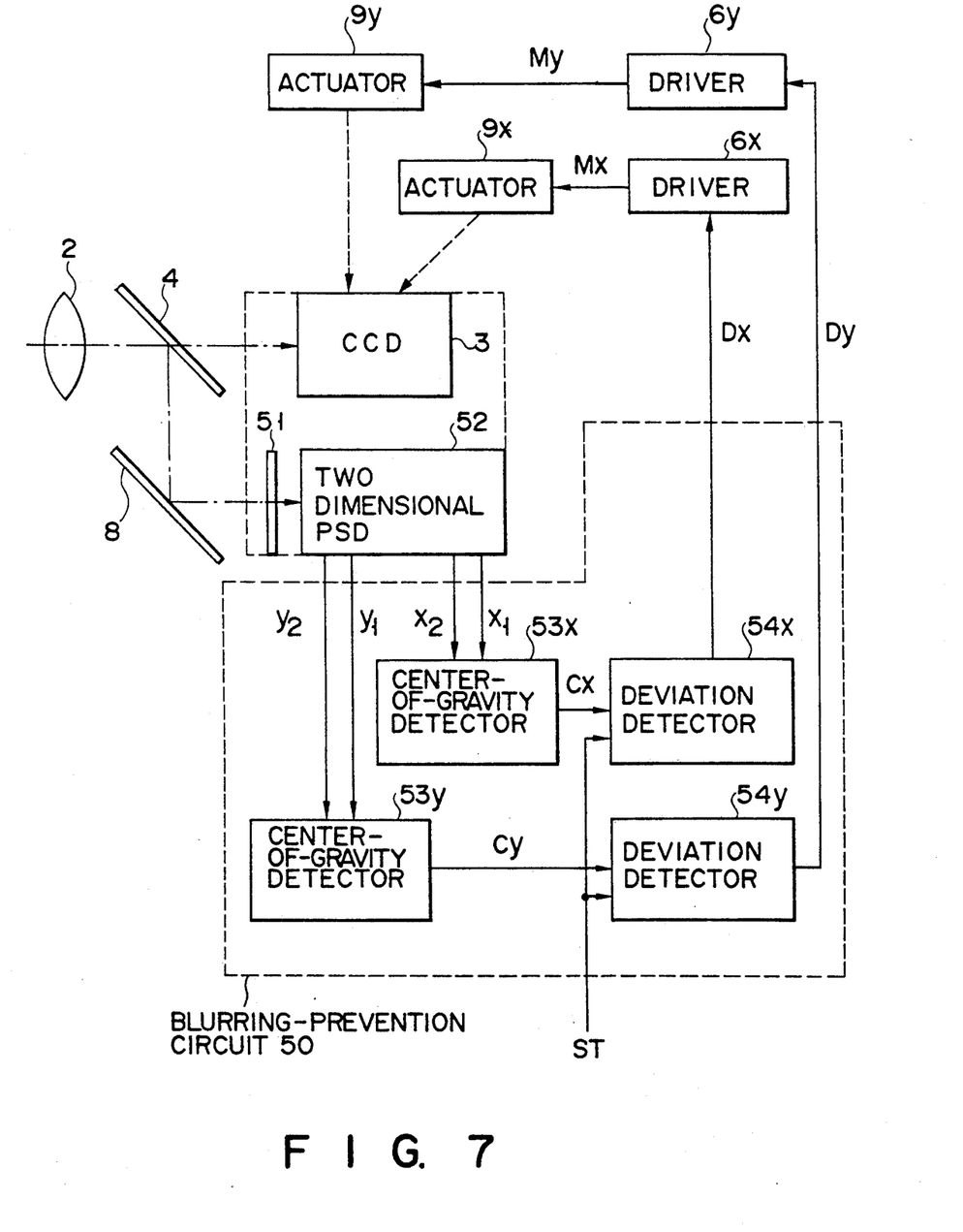
FIG. 7 shows the structure of a main part of an electronic still camera according to a second embodiment of the invention.

In the second embodiment, as depicted in FIG. 7, the actuators 7x and 7y for controlling the position of the optical axis of the optical lens 2 of the first embodiment are replaced by actuators 9x and 9y disposed on a support member (not shown) for supporting the CCD 3, whereby the position of the CCD 3 can be two-dimensionally moved in directions perpendicular to the optical axis (central axis) thereof. It is necessary to coincide the light incident on the CCD 3 with that on the PSD 52. Therefore, the two-dimensional PSD 52 and filter 51 are also integrally fixed on the support member of the CCD 3 and, thus the two-dimensional PSD 52 and filter 51 are movable as one body with the CCD 3. The light image reflected by the half mirror 4 is reflected by a reflection mirror 8 and is incident on the PSD 52 through the optical filter 51. The other structural features of the second embodiment are similar to those of the first embodiment.

In the second embodiment, when the camera is shaken during exposure and consequently the position of the object image formed on the light-receiving surface of the two-dimensional PSD 52 is displaced, the deviation detectors 54x and 54y output detection signals Dx and Dy representing the deviation of the center of gravity. Thus, the actuators 9x and 9y are driven by the actuator drivers 6x and 6y. Accordingly, the position of the optical axis of the CCD 3 is corrected so as to reduce the positional deviation to zero. In this case, along with the position of the CCD 3, the position of the two-dimensional PS 52 is correspondingly corrected. Therefore, the position correcting operation for the object image on the CCD 3 can be monitored by the blurring-prevention circuit 50 including the two-dimensional PSD 52.

According to the second embodiment, as stated above, a high-quality clear image free from the influence of camera shaking can be easily obtained, as in the first embodiment. In addition, since the influence of camera shaking is canceled by controlling the position of the optical axis of the CCD 3, the drive mechanism is simplified, as compared to the case of controlling the position of the image pickup optical lens 2. Therefore, the camera can be reduced in size and weight, and the manufacturing cost thereof can be decreased.

Figure 8:
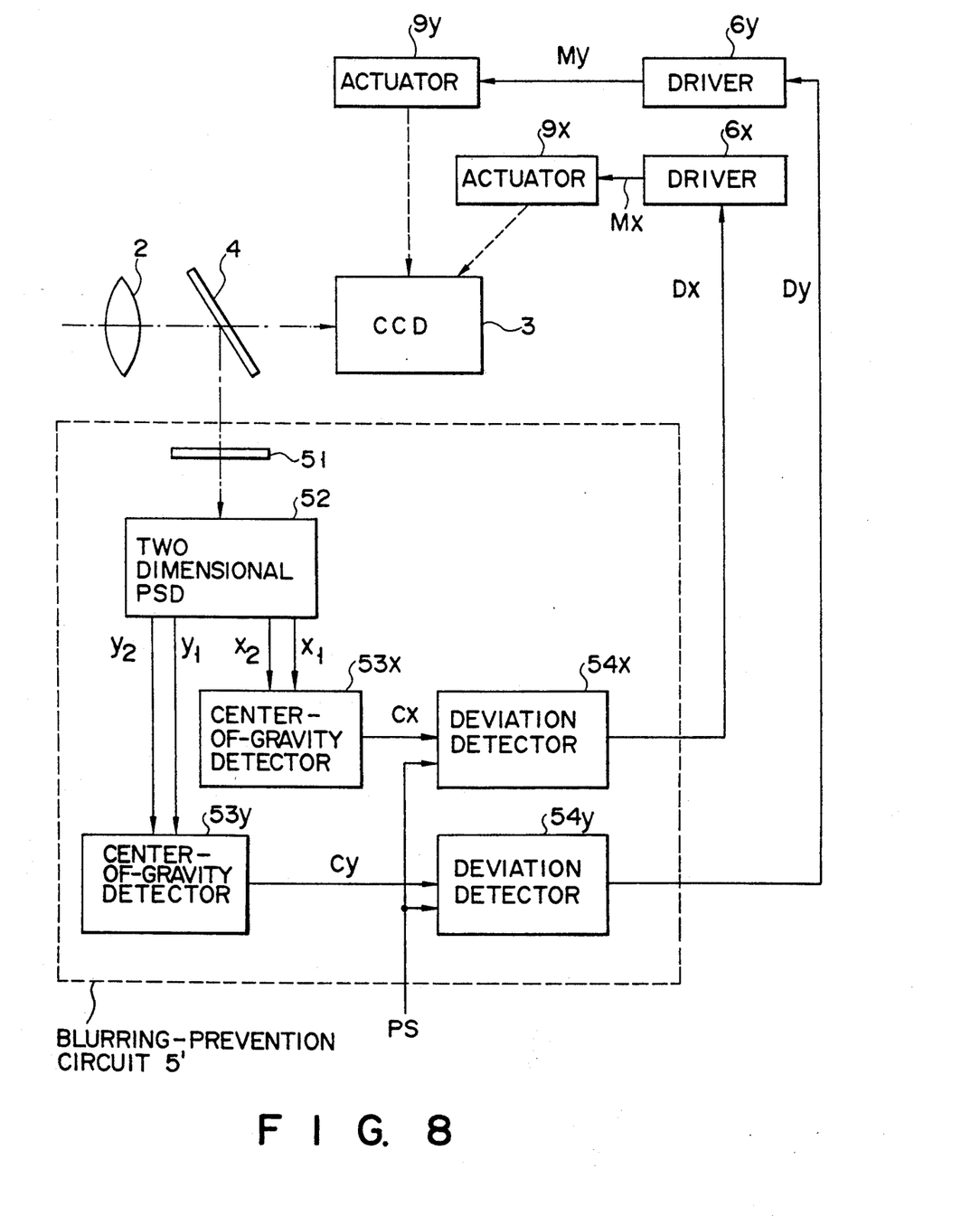
FIG. 8 shows the structure of a main part of an electronic still camera according to a third embodiment of the invention.

An electronic still camera according to a third embodiment of the invention will now be described with reference to FIG. 8. The third embodiment is an improvement of the second embodiment in which the influence of camera shaking is corrected by moving the optical axis position of the CCD 3. In the third embodiment, the two-dimensional PSD 52 is not integrally fixed on the CCD 3, but the PSD 52 is independently fixed on a support (not shown). An output timing signal PS of the two-dimensional PSD 52 which is repeatedly generated, and not the exposure start signal ST of the CCD 3, is used as a holding-timing signal to be applied to the sample-hold circuit 42 in the deviation detectors 54x and 54y.

In addition, each time the position of the optical axis of the CCD 3 is corrected by the actuators 9x and 9y, the detection signals Cx and Cy, which are output from the center-of-gravity detectors 53x and 53y after the position correction, are reset in the sample-hold circuits 42 in synchronism with the output timing signal PS of the two-dimensional PSD 52.

Accordingly, the operation for correcting the optical axis position of the CCD 3 can be monitored by a blurring-prevention circuit 5' without moving the two-dimensional PSD 52 and CCD 3 as one body. Since it is not necessary to move the PSD 52 and filter 51 along with the CCD 3 as one body, the mechanism for moving the optical axis position of the CCD 3 can be further simplified and miniaturized. In addition, since the reflection mirror 8 of the second embodiment can be omitted, the camera can be further reduced in size and weight, and the manufacturing cost thereof can be decreased.

Figure 9:
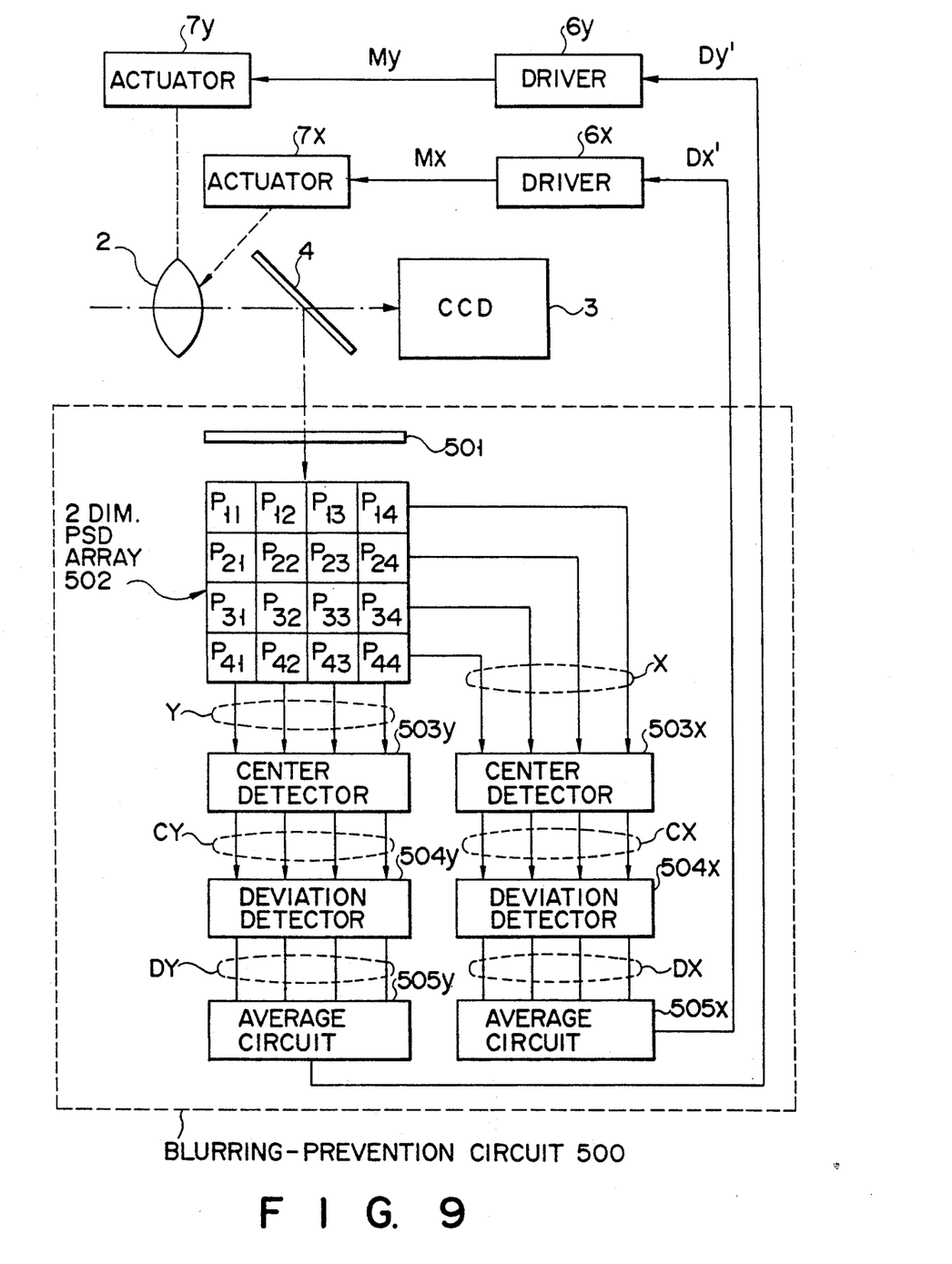
FIG. 9 shows the structure of a main part of an electronic still camera according to a fourth embodiment of the invention.

FIG. 9 shows the structure of a main part of an electronic still camera according to a fourth embodiment of the invention. In the camera of the fourth embodiment, an array of a plurality of two-dimensional PSDs, which are arranged two-dimensionally, are used as a photoelectric converter for detecting camera shaking. Using the two-dimensional PSD array, an object image is divided into a plurality of areas, each of which corresponds to each of the PSD, and each of the PSD receives the image of the area. The center of gravity of the light distribution and the positional displacement of the center of gravity are detected for each of the image areas. Only the effective values of the positional displacement are averaged, and in accordance with the averaged value the optical axis position of the image pickup optical lens 2 is moved. Thus, when a locally moving object, such as automobile, appears on the frame of the image, the influence thereof can be eliminated.

More specifically, the blurring-prevention circuit 500 includes a two-dimensional PSD array 502 in which 16 two-dimensional PSDs $P_{11}$ to $P_{44}$ are arranged two-dimensionally in a matrix. The object image reflected by the half mirror 4 passes through an optical filter 501 which is similar to the optical filter 51 of the first embodiment and is incident on the two-dimensional PSD array 502. Specifically, the object image is divided into 16 areas by the array 502. Groups of received signals X and Y output from the two-dimensional PSD array 502 are input to groups of center-of-gravity detectors 503x and 503y. The groups of center-of-gravity detectors 503x and 503y detect the center of gravity of the light distribution for each of the received signals output from the two-dimensional PSDs $P_{11}$ to $P_{44}$. Groups of detection signals Cx and Cy are supplied to groups of deviation detectors 504x and 504y. The groups of deviation detectors 504x and 504y detect the time variation of the groups of detection signals, or the deviations of the center of gravity due to camera shaking, for each of the detection signals corresponding to the two-dimensional PSDs $P_{11}$ to $P_{44}$. The groups of detection signals Dx and Dy are input to average circuits 505x and 505y.

The average circuit 505x and 505y comprises, for example, an A/D converter, a microcomputer (CPU), and a D/A converter. The groups of detection signals Dx and Dy, which are output from the groups of deviation detectors 504x and 504y and correspond to the two-dimensional PSDs $P_{11}$ to $P_{44}$, are converted to digital signals by the A/D converters and then supplied to the CPU. In the CPU, the values of the deviation detection signals are compared with each other and only the major detection values having differences within a predetermined range with respect to remaining detection values are selected and averaged. The averaged value is converted to an analog value as a deviation detection signal by the D/A converter. The deviation detection signals Dx' and Dy' output from the D/A converters are supplied to the actuator drivers 6x and 6y.

According to this embodiment, in the blurring-prevention circuit 500, the object image is divided into 16 areas by the two-dimensional PSD array 502 and each divided image is received by each of the PSD. The center of gravity of the light distribution and the time variation of the center of gravity are detected for each area. The average circuits 505x and 505y select major detection values among the deviation detection values. On the basis of the average values of the detection values, the actuators 7x and 7y are driven. Thus, even if a moving object is included in the image frame, the center-of-gravity deviation information of the light distribution due to the moving object can be eliminated by the average circuits 505x and 505y. Thus, the center-of-gravity deviation due to the moving object is not erroneously detected as the deviation due to camera shaking, and exact correction for camera shaking can be made.

As has been described above in detail, according to the present invention, an object image exposed to the image pickup surface of the image pickup means is received by the two-dimensional photoelectric converter means, a detection signal representing the center of gravity of the light distribution of the object image is output, and a deviation of the center of gravity is detected on the basis of the time variation of the detection signal generated during photographing the object. On the basis of the detected deviation of the center of gravity, at least one of the optical lens and the image pickup means is moved in a direction perpendicular to the optical axis so as to reduce the deviation to zero. Thus, the variation of the incidence position of the object image on the image pickup surface is canceled at the time of exposure of the object image, and so-called "camera shaking" which results in blurring of the image can be effectively prevented. In addition, according to the present invention, a plurality of two-dimensional photoelectric converter means are arranged in a matrix, and the object image exposed to the image pickup surface of the image pickup means are divided into a plurality of areas and received for respective areas. Detection signals representing the center of gravity of the light distribution are generated for the respective areas. Among these detection signals, the signals differing largely from the others are excluded, and the remaining signals are averaged. Based on the averaged value, the deviation of the center of gravity is detected. Thus, exact camera shaking cancellation can be made without erroneously detecting a variation of the center of gravity of the light distribution of part of the object image as camera shaking.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

Figure 10:
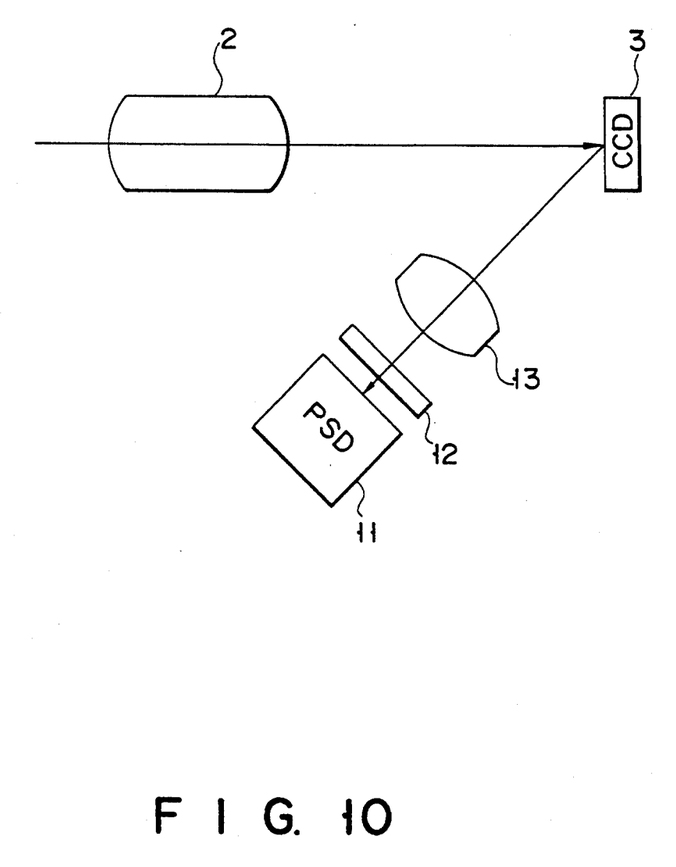
FIG. 10 shows a modification of the arrangement of the two-dimensional PSD used in the present invention.

For example, in the above embodiments, the half mirror 4 is arranged between the optical lens 2 and CCD 3, and the object image is reflected by the half mirror 4 and received by the two-dimensional PSD; however, as shown in FIG. 10, the reflected image reflected by the CCD 3 may be received by a two-dimensional PSD 11 through a focusing lens 13 and an optical filter 12. Though the image pickup surface of the CCD 3 is not a complete mirror surface, some parts of the light incident on the CCD 3 are reflected by the image pickup surface. The center of gravity of the light distribution can be detected based on the reflection light from the CCD 3. If this modified structure is employed, the half mirror 4 can be omitted; therefore, the length of light path between the image pickup optical lens 2 and CCD 3 can be shortened, and the size of the camera can be reduced.

In the fourth embodiment, the two-dimensional PSD array 502 in which a plurality of two-dimensional PSDs $P_{11}$ to $P_{44}$ are arranged in a matrix is employed to receive the object image which is divided into a plurality of areas. It is possible, however, to arrange a plurality of liquid crystal shutters in a matrix on the light-receiving surface of the single two-dimensional PSD, so that the shutters correspond to the respective areas of the light-receiving surface, and sequentially open and close the liquid-crystal shutters, thereby dividing and receiving the object image in a time-sharing manner.

In the above embodiments, the present invention is applied to the electronic still camera. However, this invention is applicable to conventional photographic cameras. This modification can be realized by merely replacing the CCD 3 used in the embodiments by a silver salt film. Further, this invention is also applicable to video movie cameras capable of performing still imaging The photoelectric converter for detecting camera shaking is not limited to the PSD; the image pickup means may be provided with a function of detecting the camera shaking so that the PSD may be omitted. Although the camera shaking can be detected on the basis of the deviation of the center of gravity of the light distribution, it can also be detected on the basis of the displacement of the light distribution itself or the displacement of the pixel having a maximum value on the image frame.

Furthermore, regarding the number of divided areas in the case of receiving an object image by dividing it into areas and the structures of the center-of-gravity detector means and the deviation detector means and the deviation correcting means, various changes and modifications may be made within the scope of the subject matter of the present invention.

What is claimed is:

1. An electronic still camera apparatus wherein an image of an object is exposed on an image pickup surface of image pickup means through an optical lens, the apparatus comprising:

first detection means having a two-dimensional photoelectric converter for receiving the image of the object exposed to the image pickup surface of the image pickup means, said first detection means outputting a detection signal representing a center of gravity of a light distribution of the image of the object;

second detection means for detecting a variation of the center of gravity, on the basis of the detection signal output from said first detection means during an exposure of the image of the object;

deviation correction means for moving at least one of said optical lens and said image pickup means in a direction perpendicular to an optical axis of said optical lens, so as to reduce the variation of the center of gravity to zero on the basis of an output from said second detection means; and wherein said two-dimensional photoelectric converter and the image pickup means are movable in a direction perpendicular to the optical axis of said optical lens as one body, and said deviation correction means includes means for moving the image pickup means and said two-dimensional photoelectric converter in a direction perpendicular to the optical axis of said optical lens so as to reduce the time variation of the center of gravity to zero on the basis of the output from said second detection means.

2. The apparatus according to claim 1, wherein said first detection means further includes an optical system for dividing the image of the object passed through the optical lens into a first part entering said image pickup means and a second part entering said two-dimensional photoelectric converter.

3. The apparatus according to claim 1, wherein said first detection means further includes an optical system for guiding the image of the object, which is reflected by the image pickup surface of said image pickup means, to said two-dimensional photoelectric converter.

4. The apparatus according to claim 1, wherein said first detection means comprises a plurality of said two-dimensional photoelectric converters, each of said converters receiving a portion of the image of the object into which the image is divided, said first detection means outputting detection signals representing the centers of gravity of light distributions of the respective portions of the image of the object;

said second detection means comprises means for detecting variations of the centers of gravity of the light distributions of the respective portions of the image, on the basis of the detection signals output from said first detection means during an exposure of the image of the object, and obtaining an averaged variation of detected variations; and said deviation correction means comprises means for moving at least one of said optical lens and said image pickup means in a direction perpendicular to an optical axis of said optical lens, so as to reduce the variations of the center of gravity to zero on the basis of the averaged variation obtained by said second detection means.

5. The apparatus according to claim 4, wherein the plurality of said two-dimensional photoelectric converters are arranged in a matrix.

6. The apparatus according to claim 5, wherein the plurality of said two-dimensional photoelectric converters are arranged in a matrix.

7. An electronic still camera apparatus wherein an image of an object is exposed on an image pickup surface of image pickup means through an optical lens, the apparatus comprising:

first detection means having a plurality of two-dimensional photoelectric converters, each of said converters receiving a portion of the image of the object into which the image is divided, said first detection means outputting detection signals representing the centers of gravity of light distributions of the respective portions of the image of the object;

second detection means for detecting variations of the centers of gravity of the light distributions of the respective portions of the image, on the basis of the detection signals output from said first detection means during an exposure of the image of the object, and obtaining an averaged variation of detected variations having differences within a predetermined range with respect to remaining ones of the detected variations; and deviation correction means for moving said optical lens and said image pickup means in a direction perpendicular to an optical axis of said optical lens as one body, so as to reduce the variations of the center of gravity to zero on the basis of the averaged variation obtained by said second detection means.

8. The apparatus according to claim 7, wherein said first detection means includes two-dimensional photoelectric converters arranged in a matrix.

9. A camera apparatus wherein an optical image of an object is exposed on a film through an optical lens, the apparatus comprising:

first detection means having a two-dimensional photoelectric converter for receiving the image of the object exposed to the film, said first detection means outputting a detection signal representing a center of gravity of a light distribution of the image of the object;

second detection means for detecting a variation of the center of gravity, on the basis of the detection signal output from said first detection means during an exposure of the image;

deviation correction means for moving at least one of the optical lens and the film in a direction perpendicular to an optical axis of said optical lens, so as to reduce the variation of the center of gravity to zero on the basis of an output from said second detection means; and wherein said two-dimensional photoelectric converter and said film are movable in a direction perpendicular to the optical axis of said optical lens as one body, and said deviation correction means includes means for moving said film and said two-dimensional photoelectric converter in a direction perpendicular to the optical axis of said optical lens so as to reduce the time variation of the center of gravity to zero on the basis of the output from said second detection means.

10. The apparatus according to claim 9, wherein said first detection means further includes an optical system for dividing the image of the object passed through the optical lens into a first part entering said film and a second part entering said two-dimensional photoelectric converter.

11. The apparatus according to claim 9, wherein said first detection means further includes an optical system for guiding the image of the object, which is reflected by the film, to said two-dimensional photoelectric converter.

12. The apparatus according to claim 9, wherein said first detection means comprises a plurality of said two-dimensional photoelectric converters, each of said converters receiving a portion of the image of the object into which the image is divided, said first detection means outputting detection signals representing the centers of gravity of light distributions of the respective portions of the image of the object;

said second detection means comprises means for detecting variations of the centers of gravity of the light distributions of the respective portions of the image, on the basis of the detection signals output from said first detection means during an exposure of the image of the object, and obtaining an averaged deviation of detected variations; and said deviation correction means comprises means for moving at least one of said optical lens and said image pickup means in a direction perpendicular to an optical axis of said optical lens, so as to reduce the variations of the center of gravity to zero on the basis of the averaged variation obtained by said second detection means.

13. A still camera apparatus wherein an optical image of an object is exposed on a film through an optical lens, the apparatus comprising:

first detection means having a plurality of two-dimensional photoelectric converters, each of said converters receiving a portion of the image of the object into which the image is divided, said first detection means outputting detection signals representing the centers of gravity of light distributions of the respective portions of the image of the object;

second detection means for detecting variations of the centers of gravity of the light distributions of the respective portions of the image on the basis of the detection signals output from said first detection means during an exposure of the image of the object and obtaining an averaged variation of detected variations having differences within a predetermined range with respect to remaining ones of the detected variations; and deviation correction means for moving said optical lens and said film in a direction perpendicular to an optical axis of said optical lens as one body, so as to reduce the variations of the center of gravity to zero on the basis of the averaged variation obtained by said second detection means.

14. The apparatus according to claim 13, wherein said first detection means includes two-dimensional photoelectric converters arranged in a matrix.

* * * * *